Figure 1:
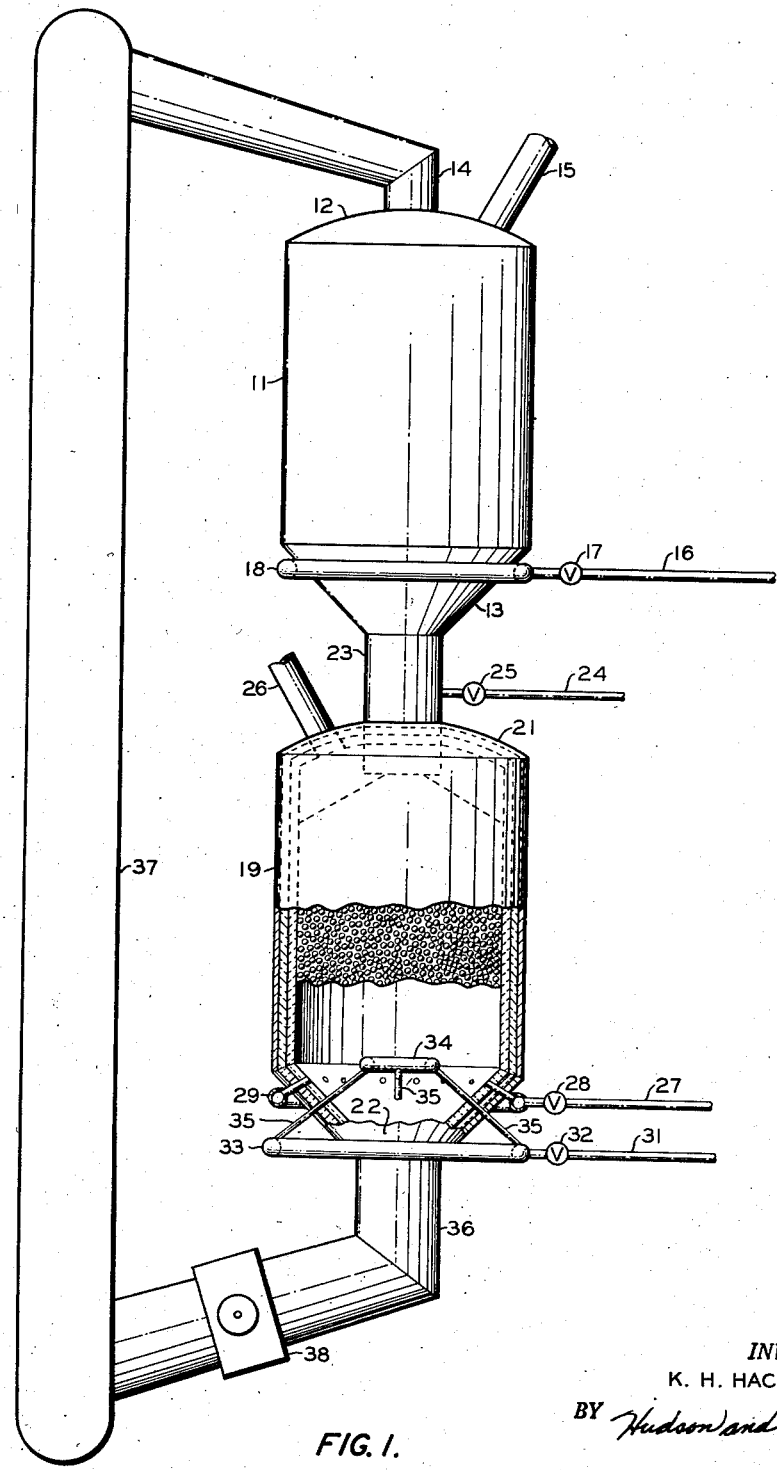

Oct. 26, 1954  K. H. HACHMUTH  2,692,903
METHOD FOR CONVERTING HYDROCARBONS
Filed Jan. 2, 1951  2 Sheets-Sheet 1

INVENTOR.
K. H. HACHMUTH
BY Hudson and Young
ATTORNEYS

INVENTOR.
K.H. HACHMUTH
BY Hudson and Young
ATTORNEYS

Patented Oct. 26, 1954

2,692,903

UNITED STATES PATENT OFFICE 2,692,903

METHOD FOR CONVERTING HYDROCARBONS

Karl H. Hachmuth, Bartlesville, Okla., assignor to Phillips Petroleum Company, a corporation of Delaware Application January 2, 1951, Serial No. 203,899

8 Claims. (Cl. 260—679)

This invention relates to the conversion of hydrocarbons. In one of its more specific aspects it relates to the conversion of hydrocarbons in pebble heater apparatus. In another of its more specific aspects it relates to the concomitant conversion in a single reactor of hydrocarbons having different refractory properties. In another of its more specific aspects it relates to a method for utilizing inherent uneven temperature distribution in pebble heater apparatus.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a gravitating bed of solid heat exchange material which flows downwardly through the chamber in direct heat exchange with hot gaseous heat exchange material. The solid heat exchange material is heated to a high temperature in the heat exchange and is then gravitated to a second chamber in which the hot solid heat exchange material is caused to contact gaseous reactant materials in a second direct heat exchange relation furnishing heat for the treatment or conversion of the gaseous materials.

Conventional pebble heater chambers of pebble heater apparatus are generally formed as cylinders in which a solid heat exchange material is collected in the form of a moving bed. Hot heat exchange gases are sometimes introduced into the cylindrical bed at the periphery of its lower end portion and are sometimes introduced through a refractory arch which supports the moving pebble bed. The solid heat exchange material is drawn from substantially a central point in the bottom of the bed and is passed downwardly into a gas heating chamber where a second moving bed of solid heat exchange material is formed.

One disadvantage in the operation of conventional pebble reaction chambers is that it is most difficult to establish uniform flow of reactant materials in contact with uniformly heated pebbles from the pebble heater chamber. In the withdrawal of solid heat exchange material from a substantially central point in the bottom of a pebble reaction chamber, the moving solid heat exchange material tends to form an inverted cone substantially conforming to the angle of repose. That material which is below and outside of the cone remains in what is substantially a stagnant area. At the same time, when solid heat exchange material is introduced centrally into the upper portion of the pebble reaction chamber, the top of the solid heat exchange material forms a cone extending downwardly and outwardly from the solid material inlet in the top of the chamber. It will thus be seen that the gravitating pebble bed in the reaction chamber is of lesser thickness at its periphery than at its axis because of the fact that the top and bottom of the bed form oppositely extending cones.

Reactant materials which are introduced into the reaction chamber are raised to conversion temperature by direct heat exchange with the hot solid heat exchange material in the reaction chamber and resulting reaction products are removed from the upper portion of the reaction chamber. The gaseous material which flows upwardly through the gravitating bed of solid heat exchange material within the reaction chamber tends to follow the path of least resistance. That path of least resistance would be along the periphery of the gravitating solid material bed inasmuch as the bed is thinner at its periphery than at its axis. A large portion of the non-uniform gas flow through a reaction chamber is due to the fact that gases tend to flow toward cool areas and the peripheral portion of the reaction chamber is the coolest area of the gravitating solid material bed within the reaction chamber. The gases are caused to expand more in the hot areas of the reaction chamber than in the cooler areas of that chamber. Thus flow of gaseous material to the cooler areas results. As hydrocarbons are converted in the cooler areas of the reaction chamber they are caused to expand, thus preventing further expansion of gases into the cooler areas in the pebble bed.

There are several reasons why the peripheral portion of the solid material bed is cooler than the axial portion thereof. It has been known for some time that solid materials flowing through the central portion of the reaction chamber gravitate more rapidly than do the solid materials in the peripheral portion of the bed unless gravitation in that axial portion is retarded by some flow control means, such as baffles, or the like. Thus the solid materials flowing through the central portion of the bed normally have less unit contact time with the gaseous materials in the reaction chamber and give up less of their heat to those materials than do solid materials flowing at a lower flow rate. On the other hand, the solid heat exchange material flowing through the peripheral portion of the solid heat exchange material bed is caused to contact gaseous material for a longer period of time by reason of its lower flow rate, thus giving up greater amounts of heat to the reactant and product materials. As the peripheral portion of the solid material of the contact bed gives up greater amounts of heat to the gaseous materials, that portion of the bed is cooled, thus allowing expansion of greater amounts of gaseous materials thereinto. Those gases in turn gain additional heat from the peripheral portion of the solid heat exchange material, lowering the temperature of that solid material still further.

Still another reason for non-uniform temperature is found in the fact that as solid materials are introduced into the top of the reaction chamber they are caused to contact some gaseous material while at the peak of the cone of solid material formed at the top of the solid material bed. As the solid material rolls downwardly and outwardly over the top of the solid material bed, the solid material contacts even more of the gaseous materials, giving up heat thereto. Thus, as the solid material finally reaches the peripheral portion of the solid material bed it has given up much more heat to gaseous material than has solid material which remains as an axial portion of the solid material bed. The temperature differential of pebbles across the top of the pebble bed between the axial portion and the peripheral portion thereof generally varies within the range of 100° F. and 250° F. depending upon the gas flow rate and pebble flow rate. An additional portion of the heat is removed from the peripheral portion of the solid material contact bed by heat transfer through the walls of the reaction chamber.

In view of the above discussion it is quite apparent that ordinarily a great temperature differential exists between the axial portion of the gravitating solid material contact bed and the peripheral portion thereof. Obviously time-temperature conditions to which the gases in the axial portion of the pebble mass are subjected are much more severe than those conditions to which gases flowing through the peripheral bed portion are subjected. Many attempts have been made to overcome this problem of uneven temperature distribution in the reaction chamber such as providing baffle members which substantially retard gravitation of pebbles through the central portion of the contact material bed, thereby providing greater unit contact time in the axial portion of the contact material bed and thus materially improving the temperature distribution. It is obvious, however, even though flow of pebbles through the length of the reaction chamber is brought to a more uniform rate by means of baffle members and the like, temperature differences still exist by reason of the heat loss of the solid contact material in its travel from the axial to the peripheral portion of the contact bed upon introduction into the reaction chamber and also heat loss through the wall of the reaction chamber.

Solid heat exchange material which is conventionally used in pebble heater apparatus is generally called "pebbles." The term "pebbles" as used herein denotes any solid refractory material of flowable size and form having strength, which is suitable to carry large amounts of heat from the pebble heating chamber to the gas heating chamber without rapid deterioration or substantial breaking. Pebbles conventionally used in pebble heater apparatus are substantially spherical in shape and range from about ⅛ inch to about 1 inch in diameter. In a high temperature process, pebbles having a diameter of between about ¼ to ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic as used in any selected process.

An object of this invention is to provide an improved method for converting hydrocarbons. Another object of the invention is to provide a method for converting hydrocarbons which utilizes inherent temperature differences which occur in reaction chambers of pebble heater apparatus. Another object of the invention is to provide a method for concomitantly converting two hydrocarbon materials in a single reaction chamber of pebble heater apparatus. Other and further objects and advantages will be apparent to those skilled in the art upon study of the accompanying discussion and the drawings.

Broadly speaking, this invention comprises controlling the distribution of specific gaseous materials in a pebble heater reaction chamber by introducting a first hydrocarbon material into the bottom of the axial portion of the hot pebble bed in a reaction chamber of pebble heater apparatus. A second hydrocarbon material which is less refractory than that introduced into the axial portion of the pebble bed is introduced at the bottom of the peripheral portion of that same pebble bed and is caused to pass upwardly through the pebble bed as an annular mass which encompasses the mass of more refractory hydrocarbon gas passing concurrently through the pebble bed with the less refractory material. Temperature conditions in the axial portion of the pebble bed are such as to cause a considerable conversion of the more refractory hydrocarbon material and temperature conditions in the peripheral portion of the pebble bed are such as to cause a considerable conversion of the less refractory hydrocarbon materials. The overall result is a considerable increase in the productive capacity of the pebble heater unit. Although some slight mixing of the hydrocarbon materials will take place within the reaction chamber, expansion of the various materials as they approach conversion temperature and after conversion will tend to maintain a phase which will be rich in more refractory hydrocarbon and one which will be rich in less refractory hydrocarbon materials.

Figure 3:
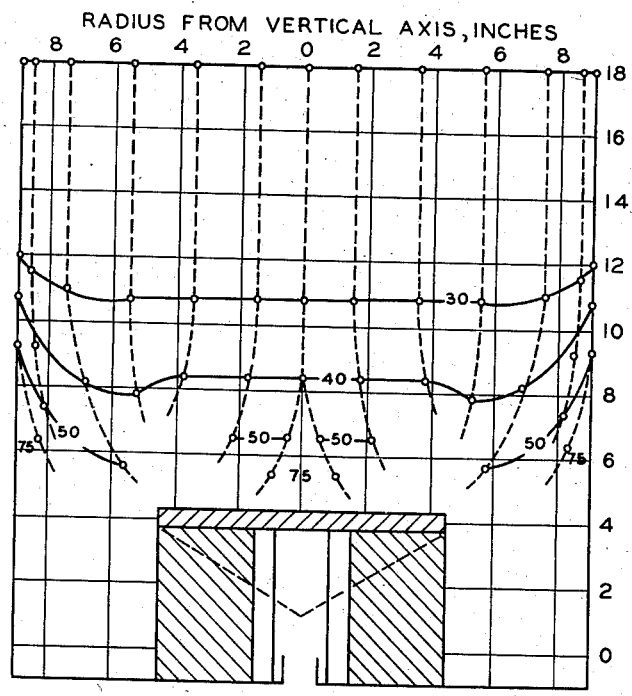
Figure 2:
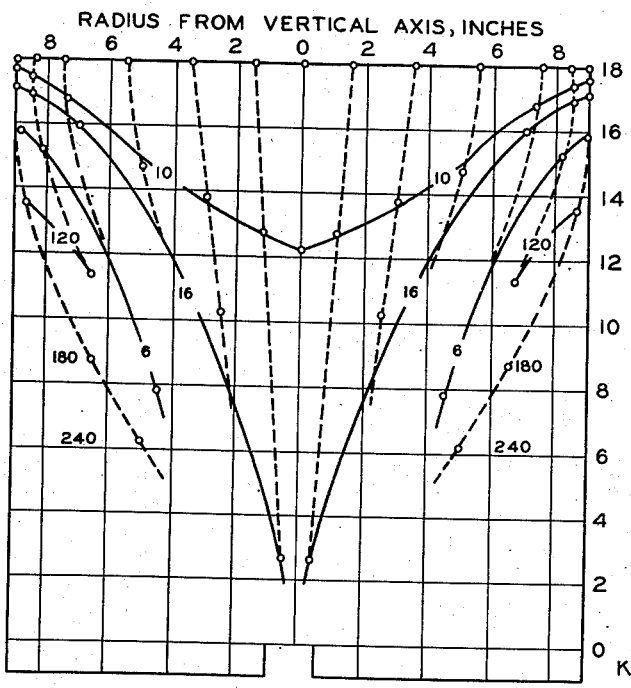

Better understanding of the invention will be obtained upon reference to the diagrammatic drawings in which Figure 1 is a schematic elevational representation of a pebble heater apparatus. Figure 2 is a graph showing normal pebble flow distribution through a pebble chamber. Figure 3 is a graph showing the effect which the presence of a centrally located baffle member has upon the flow of pebbles through a pebble chamber.

Referring particularly to Figure 1 of the drawings, pebble heater chamber 11 is an upright elongated chamber closed at its upper and lower ends by closure members 12 and 13, respectively. Centrally positioned in closure member 12 is pebble inlet conduit 14. Gaseous effluent conduit 15 is provided in the upper end portion of pebble heater chamber 11, preferably in closure member 12. Inlet conduit 16, having flow control valve 17 provided therein, extends around the lower portion of pebble heater chamber 11, preferably as header member 18, and communicates with the interior of that chamber through closure member 13.

Reaction chamber 19 is also an upright elongated chamber closed at its upper and lower ends by closure members 21 and 22, respectively. Pebble conduit 23 extends between closure member 13 of pebble heater chamber 11 and a central portion of closure member 21 of reaction chamber 19. Inlet conduit 24, having flow control valve 25 provided therein, is connected to pebble conduit 23 so as to provide inlet means for sealing gas so as to seal the pebble heater chamber from the reaction chamber, thus preventing flow of combustion gas from the heating chamber to the reaction chamber or the flow of unreacted materials or reaction products from the reaction chamber to the pebble heater chamber. Gaseous effluent conduit 26 is provided in the upper portion of reaction chamber 19, preferably in closure member 21.

Inlet conduit 27, having flow control valve 28 provided therein, extends around the lower portion of reaction chamber 19, preferably as header member 29, and communicates with the bottom of the peripheral portion of the reaction chamber 19, preferably through the upper portion of closure member 22. Inlet conduit 31, having flow control valve 32 provided therein, extends about the lower portion of reaction chamber 19, preferably as header member 33. Header member 34 is provided within the bottom of the axial portion of the reaction chamber 19 and is connected to header member 33 by a plurality of conduit members 35 which support header member 34 within the reaction chamber. Header member 34 is preferably formed as a baffle in the lower central portion of chamber 19 and is supported by conduits 35. Pebble outlet conduit 36 extends from the bottom of reaction chamber 19 and is connected at its lower end portion to elevator 37. Elevator 37 is connected at its upper end portion to the upper end portion of inlet conduit 14 which extends into pebble heater chamber 11. Pebble feeder 38 is provided intermediate the ends of pebble outlet conduit 36 and may be any conventional type of pebble feeder, such as a star valve, a gate-type valve, a vibratory feeder, or a rotatable table feeder. Elevator 37 may be any conventional type pebble elevator, such as a gas lift-type elevator or a mechanical elevator, such as a helical screw-type lift or a bucket elevator.

I have conceived a process in which a conventional pebble heater apparatus may be utilized for converting two hydrocarbon materials having different refractory properties. Better understanding of this process will be obtained upon application of this process to the apparatus described hereinbefore. Referring to Figure 1 of the drawings, pebbles are introduced into the upper portion of pebble heater chamber 11 through inlet conduit 14. Hot gases are utilized to heat the pebbles in pebble heater chamber 11 by direct heat exchange therewith. The hot gases may be combustion gases resulting from combustion of a fuel outside of the pebble heater chamber or may result from combustion of the fuel within the pebble heater chamber but separated from the pebble mass therein by any conventional means. The combustion gases may also be formed by introducing a controlled amount of fuel and air into the lower portion of the pebble mass within pebble heater chamber 11 and burning the fuel and air in direct contact with the pebbles. The hot gases are passed upwardly through the pebble mass which is gravitated through pebble heater chamber 11, raising that pebble mass to a high temperature which may be as high as 3500° F. Generally the pebbles within pebble heater chamber 11 are raised to a temperature within the range of between 1200° F. and 3200° F., depending upon the reaction products desired from the conversion within reaction chamber 19 and the reactant materials to be converted therein. Temperatures within the range of between 1000° F. and 1800° F. are normally used for the conversion of hydrocarbon oils to form normally liquid olefins and aromatic hydrocarbon fractions such as gasoline and the like. Temperatures within the range of between 1600° F. and 3200° F. are normally utilized for converting normally gaseous materials, such as ethane to ethylene, acetylene, or the like. The temperature to which pebbles are heated within pebble heater chamber 11 is normally about 100° F. to 200° F. above the highest reaction temperature desired in reaction chamber 19. The hot pebbles are gravitated from pebble heater chamber 11 through conduit 23 into the upper portion of reaction chamber 19 and gravitate through that chamber as a contiguous flowing mass therein.

The first and more refractory hydrocarbon material is introduced into the bottom of the axial portion of reaction chamber 19 in a gaseous form. That hydrocarbon material is introduced by means of inlet conduit 31, header 33, conduits 35, and header member 34. Header member 34 is provided with outlet openings spaced around the lower portion thereof. In such a modification, the hydrocarbon material passes upwardly through and around header member 34 into the axial portion of the gravitating pebble mass within reaction chamber 19. A hydrocarbon material which is less refractory than that introduced through header member 34 is introduced into the bottom of the peripheral portion of the pebble mass within reaction chamber 19 through inlet conduit 27 and header member 29. The less refractory hydrocarbon material forms an annulus around the more refractory hydrocarbon material and flows upwardly through the hot gravitating pebble mass concurrently with the more refractory hydrocarbon material.

As the hydrocarbon materials pass upwardly through the gravitating pebble mass, they tend to expand with the addition of heat thereto from the pebbles. The two masses of hydrocarbon material, however, tend to flow as substantially separate gas phases upwardly through the reaction chamber without any large amount of mixing therebetween. It should be noted that in the portion of the pebble bed in which mixing does occur, temperatures which are intermediate between the temperature of the axial portion of the pebble bed and the peripheral portion of the pebble bed are encountered. Those temperatures are such as to cause a considerable conversion of any mixture of the two hydrocarbon materials in that portion of the pebble bed. The less refractory hydrocarbon material does not necessitate as high a temperature for the conversion as does the more refractory hydrocarbon material introduced into the axial portion of the pebble mass. For that reason, I am enabled to obtain substantially the same reaction products from the reaction of the more refractory hydrocarbon material in the axial portion of the pebble mass and from conversion of the less refractory hydrocarbon material in the peripheral portion of the pebble mass. The result obtained by operation with this process is that a greater overall production of desired product is obtained than is obtained by the conversion of a single hydrocarbon material in a reaction chamber of pebble heater apparatus in which the inherent non-uniform temperature conditions exist.

Better understanding of the problem of uneven heat distribution will be obtained upon reference to Figure 2 of the drawings. Figure 2 is a graph showing pebble flow distribution in a model pebble chamber. A model pebble chamber having a diameter of 18 inches, a depth of 18 inches and a centrally located 1¼ inch pebble outlet was filled with pebbles. The pebble bed within that chamber was at a uniform level across the top. Colored pebbles were initially positioned and uniformly distributed in the top layer of the pebble bed. Given volumes of the pebbles were removed from the bottom of that chamber through the centrally located outlet and an equal amount of pebbles was added to the top of the chamber. The addition of the pebbles to the top of the chamber maintained constant pressure on the flow of pebbles by means of the weight of pebbles in the chamber. After a given volume of pebbles was removed from the pebble chamber, the pebbles which had been added were removed so as to determine the position of the colored pebbles in the pebble bed. Figure 2 shows the initial position of the colored pebbles across the top of the pebble bed before withdrawal of any pebbles from the chamber and after withdrawal of 10, 16, 60, 120, 180, and 240 liters of pebbles from the unit. Broken lines indicate the direction of flow of the colored pebbles. Isochores indicate the positions plotted for the colored pebbles after each withdrawal step.

Study of the graph shown as Figure 2 of the drawings makes apparent the problem of heat distribution encountered in a pebble chamber. It should be noted that in normal operation of pebble heater apparatus in which a centrally located pebble conduit is provided for introduction of pebbles into that chamber, the pebbles tend to form a cone which extends outwardly and downwardly from that pebble inlet to the containing chamber wall. If gases were uniformly distributed throughout the pebble chamber shown by the graph in Figure 2 of the drawings, the isochores would not only indicate pebble distribution but would also indicate temperature distribution within the pebble chamber. As has been pointed out above, however, many factors combine to aggravate unevenness of gas distribution in pebble chambers. The peripheral portion of the pebble bed is inherently cooler than the axial portion of the bed when that bed is maintained in a reaction chamber in which an endothermic reaction takes place. It is obvious, therefore, that the isochores as shown in Figure 2 actually make a much more favorable showing than would be obtained in actual operation where gas distribution is not uniform. Isochores showing temperature distribution within a pebble chamber in actual operation would extend downwardly at a much sharper angle than do the isochores shown in Figure 2.

A pebble chamber similar to that described in connection with Figure 2 of the drawings was provided with a centrally positioned plate baffle which extends outwardly beyond the circumference of the centrally located outlet conduit. The plate baffle was supported on a plurality of pillar supports which would effect pebble flow conditions similarly to conduits 35 shown in Figure 1 of the drawings. The chamber was filled to a depth of 18 inches and colored pebbles were located in the upper layer of the bed similarly to those shown in Figure 2 of the drawings. Many volumes of pebbles were withdrawn through the centrally positioned outlet conduit in the bottom of the pebble chamber while equal amounts of pebbles were added to the top of the pebble bed. The positions of the colored pebbles were determined after the withdrawal of 30, 40, 50, and 75 liters. A substantially uniform pebble flow was maintained across the pebble bed during the withdrawal of 30 liters of pebbles and with very little drop-out in the side portions of the pebble bed after an additional 10 liters of pebbles had been withdrawn. Study and comparison of the two graphs will disclose that a far greater uniformity of pebble flow was obtained in a pebble chamber in which a disc baffle was utilized than in the chamber in which no baffle was provided. It should be noted, however, that even though the more uniform pebble flow was obtained by means of this centrally positioned baffle, some substantial non-uniform temperature distribution would be obtained across the pebble bed. For this reason it is apparent that this process may be utilized in pebble heater apparatus which fails to provide a baffle for bettering pebble flow characteristics and also in pebble heater apparatus which utilizes such a baffle in the reaction chamber.

While this invention has been particularly described in connection with a temperature differential extending downwardly from the axial portion of the pebble bed to the peripheral portion thereof, it should be noted that a modification of this invention is equally applicable when the temperature runs in the opposite direction, i. e., downwardly from the peripheral pebble bed portion to the axial portion thereof. At times a perforate central pebble baffle is used immediately below the pebble inlet conduit of a pebble chamber so as to obtain a gravitating pebble bed of more uniform depth. Obviously cooling of the pebbles takes place as they flow from the pebble inlet across the baffle to the periphery of the pebble chamber in heat exchange with the gaseous materials flowing through the chamber. As the pebbles flow downwardly around the baffle and inwardly over the top of the pebble bed to form a pebble bed top in the shape of an inverted cone, those pebbles which pass from the pebble bed periphery to the axial portion of the bed enter into even more heat exchange with the gaseous material and the temperature differential extends in a direction opposite that first described. The method of operation of this invention is modified very simply by introducing the less refractory feed into that portion of the reaction chamber pebble bed which is at the lower temperature and a more refractory feed into that portion of the pebble bed which is at the higher temperature.

The following example demonstrates the improvement in productive capacity which can be obtained when operating a pebble heater unit by the method of this invention as against conventional operation.

EXAMPLE

One calculation for production of ethylene was based upon a single multi-component feed, that feed comprised ethane and propane as the reactive portions and methane as an inert portion thereof. For the purpose of making the calculations, two gas flow elements were selected, element A being selected from the axial portion of the pebble bed and element B being selected from the peripheral portion of the bed. The same reactor diameter and overall throughput of individual hydrocarbon and pebble flow rate were assumed for the purpose of this and the second calculations. Reaction conditions and results connected with the calculations in which a single feed was used is set forth below in Table I.

Table I

Reactor diameter, ft_____ 4.5
Average pebble flow rate, lb./hr_____ 41,000
Total feed rate, lb./hr_____ 5,000

A. MIXED FEED

| Gas Flow Element | A | B | A+B |
|---|---|---|---|
| Feed Composition, Wt. Percent: | | | |
| Methane | 15 | 15 | 15 |
| Ethane | 50 | 50 | 50 |
| Propane | 35 | 35 | 35 |
| Time-Temperature Conditions | Severe | Light | |
| Pebble Inlet Temperature, °F | 1,630 | 1,480 | |
| Pebble Outlet Temperature, °F | 1,167 | 750 | |
| Effluent Temperature, °F | 1,599 | 1,460 | |
| Lb. Ethane Cracked/100 Lb. of Feed | 31.2 | 4.0 | 17.6 |
| Lb. Propane Cracked/100 Lb. of Feed | 33.3 | 10.5 | 21.9 |
| Lb. Hydrocarbon Cracked/100 Lb. of Feed | 64.5 | 14.5 | 39.5 |
| Lb. Ethylene Produced/100 Lb. of Feed | 40.8 | 7.0 | 23.9 |
| Heat of Reaction, M B. t. u./100 Lb. of Feed | 97.1 | 18.4 | |

Another calculation for production of ethylene was based upon the feed used in the first calculation but the feed was split so as to provide half of it as the axial element A and half as the peripheral element B. In this calculation element A was taken as pure ethane and element B was taken as 30 weight per cent methane and 70 weight per cent propane, the amounts of the feed constituents being the same as that used in the first calculation. Results of this second calculation are set forth below in Table II.

Table II

B. SPLIT FEED

| Gas Flow Element | A | B | A+B |
|---|---|---|---|
| Feed Composition, Wt. Percent: | | | |
| Methane | 0 | 30 | 15 |
| Ethane | 100 | 0 | 50 |
| Propane | 0 | 70 | 35 |
| Time-Temperature Conditions | Severe | Light | |
| Lb. Ethane Cracked/100 Lb. of Feed | 62.4 | 0.0 | 31.2 |
| Lb. Propane Cracked/100 Lb. of Feed | 0.0 | 21.0 | 10.5 |
| Lb. Hydrocarbon Cracked/100 Lb. of Feed | 62.4 | 21.0 | 41.7 |
| Lb. Ethylene Produced/100 Lb. of Feed | 51.5 | 6.4 | 29.0 |
| Heat of Reaction, M B. t. u./100 Lb. of Feed | 131.0 | 20.0 | |
| Increase in Heat Requirement, per cent | 35 | 9 | |

The effect of changing the feed method upon the total hydrocarbon conversion and the ethylene yield is apparent from examination of the data set forth in the two tables above. With the mixed feed, 39.5 pounds of hydrocarbon are cracked per 100 pounds of feed to give a yield of 23.9 pounds of ethylene. With 100 pounds of split feed, 41.7 pounds of hydrocarbon are converted to yield a total of 29.0 pounds of ethylene. The productive capacity of the pebble heater unit is increased about 20 per cent by the change in method of feed introduction. An increase in the amount of heat absorbed takes place in the axial and peripheral chamber portions of the pebble bed. The greatest increase in heat absorption, however, takes place in the axial portion of the chamber as desired.

The specific feeds used in the above example is simply exemplary of the feeds which can be used in the process of this invention. Other combinations of feeds can obviously be made, depending upon their comparative refractory properties, in the light of this disclosure. Particularly desirable as feeds for the method of this invention are ethane, propane, and butane. Variations of this method by modification as to specific feeds are believed to be within the spirit and scope of this invention.

I claim:

1. A method of operating pebble heater apparatus for cracking refractory hydrocarbons which comprises in combination the steps of gravitating a mass of pebbles through a pebble heating zone; passing hot gaseous materials upwardly through and in direct heat exchange with said gravitating mass of pebbles in said pebble heating zone so as to raise the temperature of said pebbles within said pebble heating zone to a temperature within the range of between 1200° F. and 3400° F.; removing gaseous effluent from the upper portion of said pebble heating zone; gravitating said heated pebble mass from the bottom of said pebble heating zone into the upper portion of a reaction zone as a single restricted pebble stream, and downwardly through said reaction zone as a contiguous pebble mass; introducing a first refractory reactant material into the bottom central portion of said pebble mass within said reaction zone; introducing a second refractory reactant material having a lower conversion temperature than said first reactant material into the bottom peripheral portion of said pebble mass within said reaction zone; passing both of said reactant feeds upwardly through said reaction zone, whereby each of said reactant materials is subjected to reaction conditions; removing resulting reaction products from the upper portion of said reaction zone; gravitating pebbles from the lower portion of said reaction zone; and elevating said pebbles to the upper portion of said pebble heating zone.

2. The method of claim 1, wherein a temperature differential exists between the pebbles in the top of the axial portion of the reaction zone and the pebbles at the peripheral portion at the top of that zone and is within the range of between 100° F. and 250° F.

3. The method of claim 2, wherein the temperature of pebbles within said pebble heating zone is within the range of between 1200° F. and 2000° F.; ethane is introduced into said bottom central portion of said pebble mass within said reaction zone; propane is introduced into the bottom peripheral portion of said pebble mass in said reaction zone; and an ethylene-rich effluent is recovered from the upper portion of said reaction zone.

4. The method of claim 1, wherein a temperature differential exists between the pebbles in the top of the axial portion of the reaction zone and the pebbles at the peripheral portion at the top of that zone and is within the range of between 100° F. and 250° F.; the temperature of pebbles within said pebble heating zone is within the range of between 1200° F. and 2000° F.; propane is introduced into said bottom central portion of said pebble mass within said reaction zone; butane is introduced into the bottom peripheral portion of said pebble mass in said reaction zone; and an ethylene-rich effluent is recovered from the upper portion of said reaction zone.

5. The method of claim 1, wherein a temperature differential exists between the pebbles in the top of the axial portion of the reaction zone and the pebbles at the peripheral portion at the top of that zone and is within the range of between 100° F. and 250° F.; the temperature of pebbles within said pebble heating zone is within the range of between 1200° F. and 2000° F.; ethane is introduced into said bottom central portion of said pebble mass within said reaction zone; butane is introduced into the bottom peripheral portion of said pebble mass in said reaction zone; and an ethylene-rich effluent is recovered from the upper portion of said reaction zone.

6. The method of claim 1, wherein the pebble temperature within said pebble heating zone is within the range of between 1800° F. and 3400° F.; and an acetylene-rich effluent is recovered from the upper portion of said reaction zone.

7. The method of operating pebble heater apparatus for cracking refractory hydrocarbons which comprises in combination the steps of gravitating a mass of pebbles through a pebble heating zone; passing hot gaseous materials upwardly through and in direct heat exchange with said gravitating mass of pebbles in said pebble heating zone so as to raise the temperature of said pebbles within said pebble heating zone to a temperature within the range of between 1200° F. and 3400° F.; removing gaseous effluent from the upper portion of said pebble heating zone; gravitating said heated pebble mass from the bottom of said pebble heating zone into the upper portion of a reaction zone as a single restricted pebble stream, and downwardly through said reaction zone as a contiguous pebble mass, thereby producing a temperature differential across said pebble mass; introducing a first refractory reactant material into the bottom portion of the pebble mass which is at the higher temperature within said reaction zone; introducing a second refractory reactant material having a lower conversion temperature than said first reactant material into the bottom portion of said pebble mass which is at a lower temperature within said reaction zone; passing in parallel relationship both of said reactant feeds upwardly through said pebble mass in said reaction zone, whereby each of said reactant materials is subjected to reaction conditions; removing resulting reaction products from the upper portion of said reaction zone; gravitating pebbles from the lower portion of said reaction zone; and elevating said pebbles to the upper portion of said pebble heating zone.

8. The method of operating pebble heater apparatus for cracking refractory hydrocarbons which comprises heating a mass of pebbles to a temperature within the range of between 1200° F. and 3400° F.; gravitating the heated pebble mass downwardly through a reaction zone as a contiguous pebble mass so that a temperature differential is produced across said pebble mass; introducing a first refractory reactant material into that portion of the pebble mass having the higher temperature; introducing a second refractory reactant material having a lower conversion temperature than said first reactant material into that portion of the pebble mass having the lower temperature; passing both of said reactant materials upwardly through said reaction zone; removing common resulting reaction products from the upper portion of said reaction zone; and gravitating pebbles from the lower portion of said reaction zone.

References Cited in the file of this patent

UNITED STATES PATENTS

| Number | Name | Date |
|---|---|---|
| 2,385,326 | Bailey | Sept. 5, 1945 |
| 2,394,651 | Alther | Feb. 12, 1946 |
| 2,439,730 | Happel | Apr. 13, 1948 |
| 2,448,257 | Evans | Aug. 31, 1948 |
| 2,468,508 | Munday | Apr. 26, 1949 |
| 2,493,036 | Savage et al. | Jan. 3, 1950 |
| 2,518,304 | Goins | Aug. 8, 1950 |
| 2,548,286 | Bergstrom | Apr. 10, 1951 |